May 13, 1952   R. F. WILD   2,596,751
CONTROL APPARATUS
Filed Nov. 3, 1949
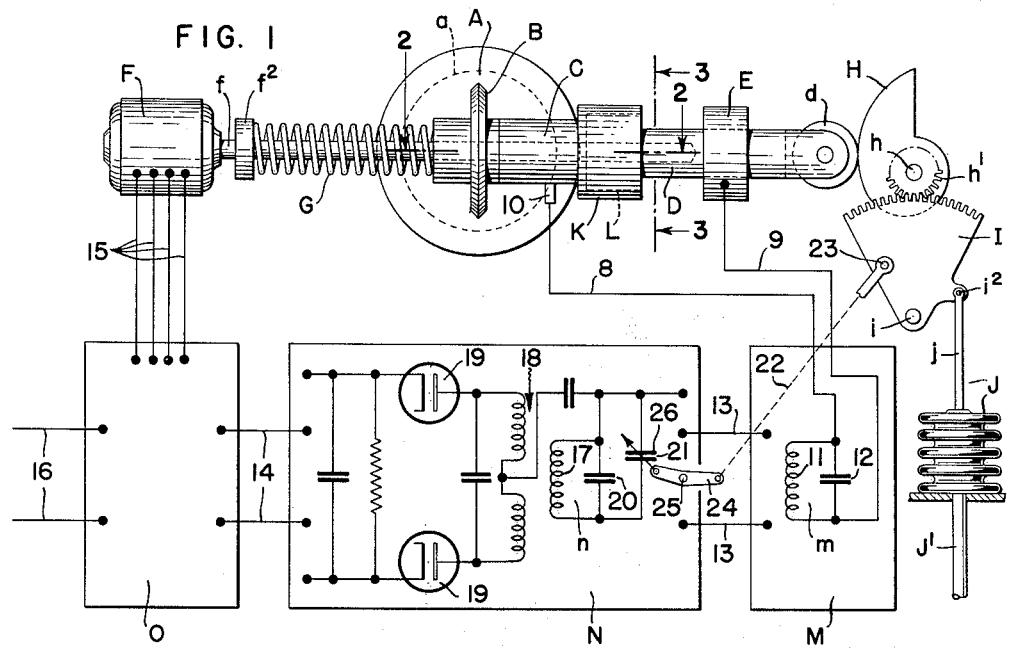
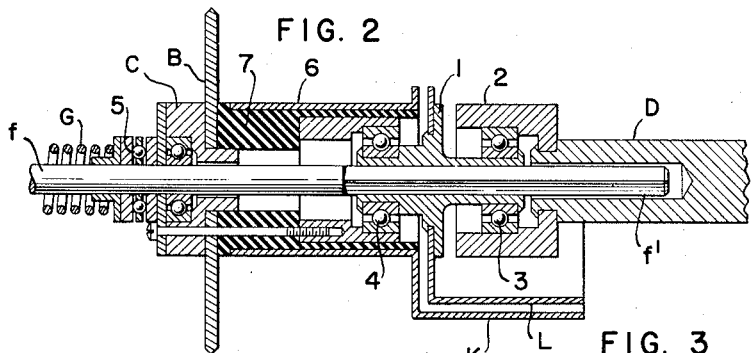
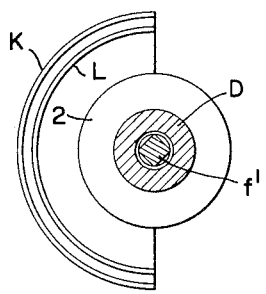
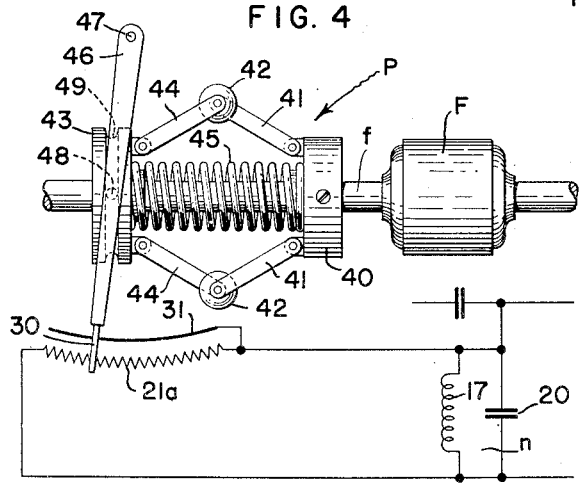
*INVENTOR.*
RUDOLF F. WILD
BY Arthur H. Swanson
ATTORNEY.

Patented May 13, 1952

2,596,751

UNITED STATES PATENT OFFICE 2,596,751

CONTROL APPARATUS

Rudolf F. Wild, Wilmington, Del., assignor to Minneapolis-Honeywell Regulator Company, Minneapolis, Minn., a corporation of Delaware Application November 3, 1949, Serial No. 125,200

5 Claims. (Cl. 318—312)

The general object of the present invention is to provide an improved torque amplifier of the type in which a leader element is rotated at a speed varying in predetermined accordance with changes in the value of a controlling variable, and in which a follower element is rotated by a control motor at a speed determined by automatic control apparatus responsive to variations in the follower speed relative to the leader speed, and operating to increase or decrease the following speed as required to maintain the two speeds approximately equal at all times.

Such a torque amplifier may be advantageously employed in measuring and control apparatus of various types and used for various purposes in which it is desirable to rotate the leader at a controlled speed which could not be maintained if the leader were subject to a significant loading or retarding force. Thus, for example, the leader may be rotated with a speed proportional to the speed of a ship, as disclosed in the Booth Patent 2,444,329, of June 29, 1948, or the leader may be rotated with a velocity corresponding to the rate of fluid flow in a conduit, as is disclosed in Patent 2,457,792, granted December 28, 1948, on a joint invention of Lloyd B. Cherry and myself.

In the operation of the leader element of prior torque amplifiers at widely varying speeds, there is a tendency to undesirable fluctuations in the follower speed in one portion or another of the common speed range of the leader and follower. Thus with the prior apparatus arranged to operate satisfactorily at relatively high speeds of the leader and follower, the follower tends to over travel and hunt at relatively low speeds. I have discovered that such follower speed fluctuations can be eliminated, or materially reduced, by varying the sensitivity with which the control apparatus responds to variations in the relative speeds of the follower and leader, as the speed range of the latter is varied.

Specifically, I have discovered that such apparatus controlling the speed of the follower element needs to have its sensitivity lower when the leader speed is relatively low, than when the leader speed is relatively high, and a specific object of the present invention is to provide means through which the means employed to vary the speed of the leader element as the control condition varies will simultaneously vary the sensitivity of the control apparatus during a predetermined portion of its speed range.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is a view diagrammatically illustrating an embodiment of the present invention;

Fig. 2 is a partial section on the line 2—2 of Fig. 1;

Fig. 3 is a section on the line 3—3 of Fig. 2; and

Fig. 4 is a diagram illustrating modifications of portions of the apparatus shown in Fig. 1.

In Fig. 1, I have diagrammatically illustrated an embodiment of the present invention in which a turn table A is rotated at a constant speed by a motor $a$. A variable speed friction wheel B has its rim in engagement with the face of the turn table A and is mounted to rotate about, and is adjustable in the direction of, its axis which is radial to the axis of the turn table A. In operation, the wheel B is thus rotated at a speed increasing with the displacement of the wheel B in the direction of its axis from the axis of rotation of the turn table A. In the arrangement shown in Fig. 1 and in greater detail in Fig. 2, the wheel B is secured to the tubular shaft C. The latter is coupled by a swivel connection to a rod like member D in alignment with the shaft C. The member D is slidingly mounted in a stationary guide bracket E and shares the axial movement of the shaft C. The member D and bracket E have a spline connection so that the member D cannot share the rotative movement of the shaft C.

As shown in Fig. 2, the swivel connection between the members C and D comprises an element 1 which has one end journalled in a cup shaped extension 2 of the member D by means of a ball bearing element 3. The other end of the element 1 is journalled in the tubular shaft C by means of a ball bearing element 4. The element 1 is formed with a central passage, square in cross section, to slidingly receive an end portion $f'$ of the shaft $f$ of a retuning or rebalancing motor F. The shaft $f$ is in axial alignment with the shaft C and is normally rotated by the motor F at an average speed equal to the average speed of rotation of the wheel B and shaft C, though changes in the speed of the shaft C are not instantly followed by equal changes in the speed of the shaft $f$. The shaft portion $f'$ is square in cross section and forms a spline connection with the wall of the square central passage through the element 1, so that the latter rotates with the shaft $f$. As shown, the shaft structure C is provided at its left hand end with a ball bearing element 5 in which the shaft $f$ is journalled so that small temporary variations in the speed of the shaft $f$ relative to the shaft C, do not interfere frictionally with the rotation of the wheel B at the rate predetermined by its displacement from the axis of the turn table A.

A compression spring G surrounds the shaft $f$ and acts between a circumferential rib $f^2$ on the shaft $f$ and the adjacent end of the shaft structure C and thus biases the wheel B, shaft C and member D for movement to the right as required to maintain the member D in operative engagement with an edge cam H. The latter is secured to an angularly adjustable shaft $h$ having its axis in a plane perpendicular to the axis of the wheel B. As diagrammatically shown in Fig. 1, the shaft $h$ is angularly adjusted in response to the variations in a controlling condition by a control element J acting on the shaft $h$ through a gear segment I. The latter is mounted on a pivot $i$ to turn about an axis parallel to the axis of shaft $h$ and has its gear teeth in mesh with a spur gear $h'$ secured to the shaft $h$. As shown, the responsive device J is in the form of an expansible bellows element, having its movable end wall connected by the stem $j$ to a crank pin $i^2$ carried by the gear segment I at some distance from the pivot $i$. The bellows element J is arranged to expand and contact in response to variations in a control pressure transmitted to the member J through a pipe $J'$.

The speed of the motor F is controlled by apparatus hereinafter described in detail and which includes as primary control elements, a metallic condenser plate K mounted on and rotated by the shaft C and a condenser plate L mounted on the element 1 and therefore rotated by the shaft $f$. The condenser plates K and L constitute the "leader" and "follower" elements of the control apparatus illustrated. As shown, the element K is in the form of a section of a metal cylinder coaxial with the shaft C and integrally connected to a tubular hub or sleeve portion 6 surrounding and attached to the shaft structure C. The plate K and sleeve 6 are insulated from the metallic portion of the shaft C by insulation 7.

The plate L is in the form of a section of a cylinder coaxial with the element K and having an external diameter slightly smaller than the internal diameter of the member K, thus providing a thin annular air space between the plates K and L. The plate L is formed of metal and is mounted on and electrically connected to the element 1 and associated shaft D and thereby to the metallic bracket E. The plates K and L are electrically connected to other portions of the control apparatus through conductors 8 and 9. The conductor 8 has one end electrically connected to the rotating sleeve portion 6 of the member K through a brush 10, and the conductor 9 has one end connected to the non-rotatable metallic bracket E which as previously stated is electrically connected to the follower element L.

The apparatus shown diagrammatically in Fig. 1, and hereinbefore described in detail is similar in principle to apparatus disclosed in the previously mentioned Booth patent, 2,444,329.

The variable condenser formed by the plates K and L is connected through the conductors 8 and 9 across the inductance 11 included in parallel with a fixed condenser 12 in a tuned circuit $m$. A variation in the relative positions of the plates K and L and the resultant variation in the capacity included in the circuit $m$ varies the frequency of oscillation of a high frequency oscillator M forming one element of a control system for the retuning or rebalancing motor F. That system also includes a frequency discriminator N, and a voltage and power amplifying element O, and is of a type disclosed and claimed in my Patent 2,532,872 granted December 5, 1950, on my application Serial No. 537,505, filed May 26, 1944. That type of control system is also disclosed in the above mentioned Patent 2,457,792. The output terminals of the high frequency oscillator M are connected by conductors 13 to the input terminals of the discriminator section N. The output terminals of the discriminator section N are connected by conductors 14 to input terminals of the voltage and power amplifier section O. The output terminals of the voltage and power amplifier section O are connected by conductors 15 to the energizing terminals of the motor F. The control system is connected to and energized by a source of alternating current of relatively low frequency, for example, 60 cycles per second which as shown diagrammatically in Fig. 1, is directly connected to the voltage and power amplifier section O by supply conductors 16.

The oscillator M may well be tuned to produce radio frequency oscillations, for example of 450 kc. per second, when the relative positions of the plates K and L give the circuit $m$ maximum capacity and tune the oscillator for the production of oscillations of minimum frequency. A change of the relative positions of the plates K and L modifies the tuning effect of the circuit $m$ and thereby alters the oscillation frequency of the oscillator M. The minimum oscillation frequency can be maintained in the particular arrangement described only when the motor shaft $f$ and friction wheel B are rotating at the same speed and in the relative angular or phase relation in which the capacity of the condenser including the plates K and L is at its maximum value. Advantageously the action of the oscillator M is modulated or keyed so that the high frequency oscillations produced are maintained at an approximately constant amplitude during alternating half cycles, and disappear during the other half cycles, of the low frequency voltage supplied by the supply conductors 16.

The frequency discriminator section N may be of any usual type, and, as indicated diagrammatically in Fig. 1, may comprise a discriminator circuit of the well known conventional type comprising a tuned circuit $n$ including a coil 17 which forms the primary winding of an intermediate frequency transformer 18. The split secondary winding of that transformer has its end terminals connected to the anodes of the diodes 19 through which an output current flows undulating at the frequency of the low frequency voltage, and dependent in phase on the direction of displacement of the follower condenser plate L from its balance position relative to the leader plate K. As shown, the tuned circuit $n$ includes a fixed condenser 20 and a variable condenser 21, each connected in parallel with the inductance 17. In accordance with the present invention, the condenser 21 is automatically adjusted in a manner hereinafter explained, as the speed of the wheel B is varied.

The voltage and power amplifier section O includes energizing and control mechanism through which the speed of the motor F may be varied, and its direction of rotation reversed, in accordance with variations in the magnitude and phase of the undulating output current of the discriminating section N. The motor F and its energizing mechanism may well be of the character disclosed in the above mentioned Patent 2,457,792, and disclosed in greater detail, and claimed, in the Wills Patent 2,423,540 of July 8, 1947. It is to be noted, however, that in the use of the motor to rebalance a potentiometer bridge circuit specifically illustrated in said Wills patent, the motor operates intermittently, and normally operates about as frequently in one direction as in the opposite direction. In the contemplated use of the apparatus shown in Fig. 1, however, the motor F will ordinarily operate only in the direction in which the leader shaft C rotates. However, when a sudden decrease in the leader shaft speed occurs, the momentary reversal in the direction in which the section O tends to rotate the motor F, subjects the latter to a desirable damping action. Further reference to the general construction and operation of the control apparatus seems unnecessary in view of the earlier disclosures of such apparatus to which reference has been made.

In the form of the invention shown in Fig. 1, the capacity of the condenser 21 is automatically adjusted on and as a result of changes in the speed of the wheel B. This adjustment is effected in the apparatus diagrammatically illustrated in Fig. 1, through means actuated by the mechanism through which the edge cam H is rotated to adjust the wheel B toward and away from the axis of the turn table A. As diagrammatically shown, the adjustment of the condenser 21 is directly effected by means of a link 22 connected at one end to a crank pin 23 carried by the gear segment I at a distance from its supporting pivot i. The link 22 has its second end connected to one arm of a lever 24, which is pivoted at 25, and the second arm of which carries one of the two plates 26 included in the condenser 21, so that the angular adjustment of the lever 24 varies the capacity of the condenser 21.

Under the operating conditions, usually prevailing, the maximum sensitivity of the control apparatus is needed when the displacement of the wheel B from the axis of the turn table A and the rotative speed of the wheel are at their respective maximums. Under that condition, a given proportional difference between the angular speeds of the leader K and follower L during a given short time period, following a change in the leader speed will result in a substantially greater angular displacement of the follower L from the leader K when the speed of the leader K is relatively high, than when it is substantially lower. Ordinarily, therefore, in the use of the present invention, the condenser 21 and its adjusting mechanism should be arranged to insure maximum sensitivity of the control apparatus when the displacement of the wheel B from the axis of the turn table A is at a maximum, and to insure a substantially lower control apparatus sensitivity when the displacement of the wheel A from the turn table axis is small and the speed of the leader K is correspondingly low. Such reduction in the control apparatus sensitivity eliminates, or substantially reduces, the tendency of the follower L to overtravel relative to the leader K, during each retuning operation in which the follower angular speed either exceeds or is less than the leader speed, accordingly as the preceding retuning change in the leader speed was an increase or a decrease, respectively.

The sensitivity adjustment obtained in Fig. 1 by adjustment of the amount of capacity in shunt with the coil 17 in the circuit $n$, may be effected by varying the impedance in said circuit in other ways. Thus, for example, the circuit $n$ may be detuned to vary the sensitivity of the control apparatus by the adjustment of an iron core in the coil 17. As those skilled in the art will understand, use may be made of other effective arrangements for varying the tuning of the circuit $n$. The arrangements shown in Figs. 1 and 2 appear to be especially desirable, however, because of their effectiveness and simplicity. As will be apparent to those skilled in the art, the sensitivity regulation provided for herein is concerned with the electronic control system alone and not with the overall follow-up system through which the condenser including the plates K and L are given returning adjustments.

Alternatively, the sensitivity of the control apparatus may be adjusted by adjusting the resistance of a variable resistor 21a which replaces the condenser 21 of Fig. 1, as illustrated in Fig. 4. As shown in Fig. 4, the effective resistance of the resistor 21a in parallel with the coil 17 and fixed condenser 20 of Fig. 1, may be varied by adjusting a slider or bridging contact 30 along the resistor 21a, the slider contact 30 being at all times connected by a conductor 31 to one terminal of the resistor 21a. The adjustment of the resistance of the resistor 21a just described is not a tuning adjustment of the circuit $n$, but varies the Q of the discriminator primary circuit, and consequently varies its resonant impedance. The contact 30 may be mechanically connected to the apparatus for adjustment by the speed of the wheel B in any suitable manner. For example, the resistor 21a may be so disposed relative to the link 22 that the latter may be directly connected to the contact 30 so that the longitudinal adjustment of the link will adjust the contact along the resistor. Also, the contact 30 may be adjusted along the resistor 21a by other means than those shown in Fig. 1 for adjusting the condenser plate 26, and one form of such other means is shown in Fig. 4, and is hereinafter described.

Because of the friction between the slider 30 and resistor 21a and conductor 31, the arrangement shown in Fig. 4 requires an exercise of more force by the link 22 or other adjusting element, than is required with the arrangement shown in Fig. 1. In many cases, however, the condition responsive element J is adapted to provide ample force to overcome the frictional resistance to the movement of the slider 30.

The adjustment means shown in Fig. 4 comprises a control element P actuated by the motor F, to effect a discriminator adjustment as the speed of the motor varies. As shown in Fig. 4, the device P is a conventional fly ball governor comprising a collar 40 rigidly secured to the shaft $f$ of the motor F, and a pair of arms or links 41, each pivotally connected at one end to the collar 40, and each pivotally connected at its opposite end to a corresponding fly ball or weight 42. The fly ball governor P also comprises a second collar 43 mounted on and slidable longitudinally of the shaft $f$. Each fly ball 42 is connected to the collar 43 by a separate arm or link 44 having one end pivotally connected to the corresponding ball 42 and having its second end pivotally connected to the collar 43. A spring 45 interposed between the collars 40 and 43 and tending to spread the latter apart, provides a restraining force restricting the outward movement of the fly balls 42 away from the shaft $f$ under the action of centrifugal force. In consequence, the displacement of the collar 43 longitudinally of the shaft $f$ from the collar 40 varies in predetermined accordance with the variations in the speed of rotation of the shaft $f$.

In the form of the invention shown in Fig. 4, the adjustment of the collar 43 into different positions in predetermined correspondence with variations in the rotative speed of the shaft $f$, is employed to adjust the portion of the resistance $21a$ operatively included in the discriminator circuit. As diagrammatically illustrated, the adjustment of the collar 43 adjusts the previously mentioned slider contact 30 through a lever 46 which is pivoted at one end to a stationary pivot 47 at one side of the shaft $f$ and extends across the shaft and having the bridging contact 30 connected to, but insulated, from its other end. Intermediate of its ends, the lever 46 is provided with a projection 48 which extends into a circumferential groove 49 formed in the peripheral portion of the collar 43. In consequence, the movement of the collar 43 longitudinally of the shaft $f$ causes the lever 46 to turn about its pivot 47 and to move the contact 30 along the resistor $21a$, or at least along the portion of the resistor $21a$ which is engaged by the contact 30 when the rotative speed of the shaft $f$ approaches its minimum. In some cases, it may be desirable to use a resistor $21a$ so formed that its resistance per unit of length is substantially greater in the portion of the resistor engaged by the contact 30 when the speed of the motor F is relatively low than when it is relatively high. As will be apparent, the differences between the speed of the shafts C and $f$ are too small to be of significance in respect to the adjustment of the contact 30.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without corresponding use of other features.

Having now described my invention, what I claims as new and desire to secure by Letters Patent, is:

1. In a torque amplifier of the known type comprising a rotatable leader element and means for rotating said element at a speed varying in predetermined accordance with variations in a controlling condition, a rotatable follower element, a motor for rotating said follower element at varying speeds and an automatic motor control mechanism responsive to variations in the relative speeds of said elements for varying the speed of the follower element on and in accordance with variations in said relative speeds so as to maintain the rotative speeds of the two elements substantially equal, the improvement comprising regulating means adjustable to vary the sensitivity of said control mechanism including means for modifying the changes in the speed of the follower element resulting from variations in said relative speeds, and adjusting means automatically actuated on and in accordance with changes in the rotative speed of one of said elements to adjust said regulating means and thereby effect a predetermined variation in the sensitivity of said mechanism on a predetermined variation in said rotative speed.

2. An improvement as specified in claim 1, in which said adjusting means is a device responsive to a controlling condition operating to vary the speed of said leader element on and in accordance with changes in said condition.

3. An improvement as specified in claim 1, in which said control mechanism includes means for creating electric current oscillations varying in frequency with variations in the relative speeds of said elements and a frequency discriminator responsive to variations in the frequency of said oscillations and operative to effect variations in the speed of said motor as said frequency varies and in which said regulating means includes an adjustable impedance varying the sensitivity of said control mechanism on its adjustment, and in which said adjusting means adjusts said variable impedance to thereby vary the sensitivity of said control mechanism.

4. In a torque amplifier of the known type comprising a turn table rotating about its axis at a constant speed, a wheel engaging and rotated by said turn table at a speed varying with the displacement of said wheel from the turn table axis, means for varying said displacement in predetermined accordance with variations in a controlling condition, a rotatable leader element connected to and rotated by said wheel, a rotatable follower element, a motor for rotating said follower element at varying speeds and an automatic motor control mechanism responsive to variations in the relative speeds of said elements for varying the speed of the follower element on and in accordance with variations in said relative speeds so as to maintain the rotative speeds of the two elements substantially equal, the characteristic operation of said control mechanism being such as to effect operation of said motor at full speed upon a small variation in the relative speeds of said leader and follower elements, when those speeds are relatively high and the motion of the follower element relative to the leader element tending to be erratic when those speeds are relatively low and the sensitivity of said control mechanism is constant, the improvement comprising regulating means adjustable to vary the sensitivity of said control mechanism including means for modifying the changes in the speed of the follower element resulting from variations in said relative speeds, and adjusting means automatically actuated on and in accordance with changes in the rotative speed of one of said elements to effect a predetermined decrease in the sensitivity of said control mechanism on a predetermined decrease in the last mentioned speed and thereby reduce the said tendency to erratic motion of said follower element.

5. In a torque amplifier of the type comprising a turn table rotating about an axis, a wheel in engagement with the turn table and rotated by the latter at a speed proportional to the displacement of the wheel from the turn table axis, means operative on and in response to changes in a control condition for varying the said displacement of the wheel from said axis, a leader element rotated by said wheel, a rotatable follower element, a motor for rotating the follower element, and motor control mechanism responsive to variations in the relative positions of said elements for increasing or decreasing the speed of the motor as required to maintain the rotating speed of the follower approximately equal to the rotating speed of the leader, the improvement comprising means adjustable to vary the sensitivity of said control mechanism including means for modifying the changes in the speed of the follower element resulting from variations in said relative speeds and means actuated on a change in the speed in one of said elements to effect a predetermined adjustment of the sensitivity of said control mechanism.

RUDOLF F. WILD.

REFERENCES CITED

The following references are of record in the file of this patent:

UNITED STATES PATENTS

| Number | Name | Date |
| --- | --- | --- |
| 2,428,017 | Devaux | Sept. 30, 1947 |
| 2,458,731 | Rath | Jan. 11, 1949 |
| 2,462,095 | Halpert et al. | Feb. 22, 1949 |
| 2,467,335 | Rath | Apr. 12, 1949 |
| 2,473,401 | Wild | June 14, 1949 |
| 2,497,051 | Wild et al. | Feb. 7, 1950 |